United States Patent [19]

Coult

[11] 4,215,900
[45] Aug. 5, 1980

[54] CHILD'S SAFETY SEAT FOR VEHICLES

[76] Inventor: Joseph Coult, 4330 W. 5655 South, Kearns, Utah 84118

[21] Appl. No.: 876,625

[22] Filed: Feb. 10, 1978

[51] Int. Cl.² .............................................. A47C 1/08
[52] U.S. Cl. .................................... 297/254; 297/216; 297/468
[58] Field of Search ............... 297/254, 216, 385, 384, 297/468; 280/746

[56] References Cited

U.S. PATENT DOCUMENTS

| 830,487 | 9/1906 | Backe et al. | 297/282 X |
| 2,679,893 | 6/1954 | Bennett | 297/282 |
| 3,111,342 | 11/1963 | De Vos | 297/326 X |

FOREIGN PATENT DOCUMENTS

| 1430398 | 11/1968 | Fed. Rep. of Germany | 280/746 |
| 2436325 | 4/1975 | Fed. Rep. of Germany | 280/746 |
| 2442044 | 3/1976 | Fed. Rep. of Germany | 297/216 |
| 2606234 | 8/1977 | Fed. Rep. of Germany | 297/216 |
| 1039131 | 8/1966 | United Kingdom | 297/216 |

*Primary Examiner*—James T. McCall
*Attorney, Agent, or Firm*—Trask & Britt

[57] ABSTRACT

A safety seat has a frame with interconnecting legs intermediate structure and back structure. Securing means such as hooks are associated with the frame to removably mount the frame to a vehicle passenger seat. A seat proportioned to accommodate a child is positionable within the frame. The seat is mounted to the frame by rotation means adapted to the intermediate structure so that the center of gravity of the seat with the child residing therein is below the pivot means. Deceleration means such as a hydraulic cylinder is secured to the seat by attachment means extending below the seat and the center of gravity and to the back structure. Upon application of external forces the seat tends to rotate about the rotation means. The deceleration means acts to retard rotation of the seat about the rotation means.

21 Claims, 12 Drawing Figures

CHILD'S SAFETY SEAT FOR VEHICLES

BACKGROUND OF THE INVENTION

1. Field

This invention relates to safety seats for children. More particularly, this invention provides a safety seat for children for use with a conventional vehicle passenger seat.

2. State of the Art

With increasing attention, the safety of vehicle passengers in recent years, a variety of devices have been devised to improve the safety of children being transported in vehicles. For example, U.S. Pat. No. 3,767,259 (Blake) discloses a safety seat assembly positionable on a motor vehicle seat. It provides means to retain the child within the portable seat and means to restrain movement of the seat and in turn the child about a hinge interconnecting the seat to support structure proximate the middle of the back of an occupant. U.S. Pat. No. 3,645,548 (Briner) teaches construction of a child's seat wherein a seat member slides on the frame upon application and of external forces. U.S. Pat. No. 3,111,342 (De Vos) teaches construction of a seat which provides for upward and backward tilting of the occupant positioned within the seat.

Apparatus such as those disclosed in the above-identified patents and other known apparatus fail to provide structure sturdy enough to withstand large impact forces. They also fail to provide adequate means to secure the portable seat to the passenger seat of the motor vehicle. Further, such devices fail to take into account the need for frictional means to decelerate or abate movement imparted to a moveable seat structure upon which the child may reside. Furthermore, such devices to the extent that they do take into account the requirement to impede movement of a movable seat structure, fail to recognize that a child may not necessarily have muscle strength to avoid whip lash even with the application of minimal forces and fail to provide structure to prevent or inhibit operation or entanglement of the child and the child's play things with supporting structure. That is, with the devices as disclosed in the above-identified patents and as otherwise heretofore known, a child could impair or defeat the effectiveness of any safety seat apparatus by having positioned play things to block appropriate designed operational movement. Accordingly, it is desirable to provide an effective safety seat for use by children wherein movement cannot be inhibited by play things and which take into account the dynamic or kinetic forces which may be experimental.

SUMMARY OF THE INVENTION

A safety seat apparatus for children includes a frame having interconnected legs, intermediate structure and back structure. Securing means is associated with the frame for removably mounting the frame to external structure. Rotation means is secured to the intermediate structure. A seat proportioned to accommodate a child is adapted to the rotation means so that the center of gravity of the seat with the child residing therein is below the pivot means. Attachment means are secured to the seat below the seat and the center of gravity. Deceleration means are secured to the back structure and to the attachment means to retard rotation of the seat about the rotation means.

The external structure may be a motor vehicle (e.g., airplane, bus, train, auto, truck) passenger seat. The securing means may include a pair of spaced apart hooks adapted to the back structure of the frame. The hooks are preferably sized to fit about the top of the seat structure. In a preferred embodiment, each hook has a foot and is rotatable thereabout and is adjustably adapted to the back structure to adjust the length substantially in the plane of the back structure.

The securing means may also include bracket means affixed to the frame to receive a seat safety belt to tensionally secure the frame to the vehicle seat.

The intermediate structure is preferably comprised of two spaced apart members connected to the back structure to extend away therefrom essentially in a horizontal direction. The spaced apart members are preferably sized in length and spaced apart in distance to receive the seat therebetween. The back structure may be comprised of two essentially vertically spaced apart members to connect with the intermediate structure. The frame may also include a plurality of spacers to selectively interconnect the spaced apart members of the intermediate structure, the spaced apart members of the back structure and the legs.

The legs preferably are comprised of four leg members two of which extend downwardly from the respective spaced apart members of the intermediate structure and two extending downwardly from respective spaced apart members of the back structure. Most preferably, the legs have means to adjust their vertical length. The seat includes a bottom, back and pair of arms each of which have an armrest extending curvedly upward and outward from the seat over the spaced apart members of the intermediate structure. The seat may also have a foot tray connected to the bottom and extend downwardly from the bottom to receive the lower legs and feet of the child. The seat is most preferably covered with a resilient padding material.

In a preferred embodiment, the rotation means includes a base structure secured to the intermediate structure, a shaft rotatably adapted to the base structure, and suspension means secured to the seat and rotatably adapted to the shaft to rotatably suspend the seat from the frame. The seat may have structure interconnecting the arms and the bottom. The suspension means may be an aperture formed in the interconnecting structure to rotatably receive the shaft. In another embodiment, the suspension means may be a flange adapted to the seat to extend upwardly from the bottom. The flange has means to rotatably receive the shaft. In yet another embodiment, the suspension means may be a flange having means to rotatably receive the shaft and a plurality of support bars connected to the seat and that flange. In yet another embodiment, the base structure is two plate members spaced apart to receive the suspension means and means to rotatably receive the shaft. Most preferably, the base member is a plate having an elongated slot formed therein essentially horizontally. The shaft is sized to rotatably and slideably fit within the slot. Means are associated with the shaft to retain it within the slot. Second deceleration means may be secured to second attachment means fixed to the seat and to the back structure. The second deceleration means retards movement of the shaft and in turn the seat in the elongated slot.

The deceleration means may be a hydraulic cylinder with a piston connected to the attachment means. A piston within the cylinder has restriction means to pass fluid therethrough. The piston is positioned at rest so that upon application of force to cause the seat to rotate about the rotation means, the piston fluid will pass through it from one side thereof to the other to retard seat movement. In another embodiment, the deceleration means may be comprised of spring means tensionally mounted between the attachment means and the back structure to retard rotation of the seat upon application of external forces to cause rotation of the seat about the rotation means.

In another embodiment, locking means may be adapted to lock the seat in a fixed position. A lever with a handle is preferably rotatably adapted to the back structure to be wedged against the lower portion of the seat and in turn selectively inhibits the seat's rotatability.

BRIEF DESCRIPTION OF THE DRAWINGS

In the drawings, which illustrate what is presently contemplated as the best mode for carrying out the invention.

DESCRIPTION OF THE ILLUSTRATED EMBODIMENT

Figure 1:
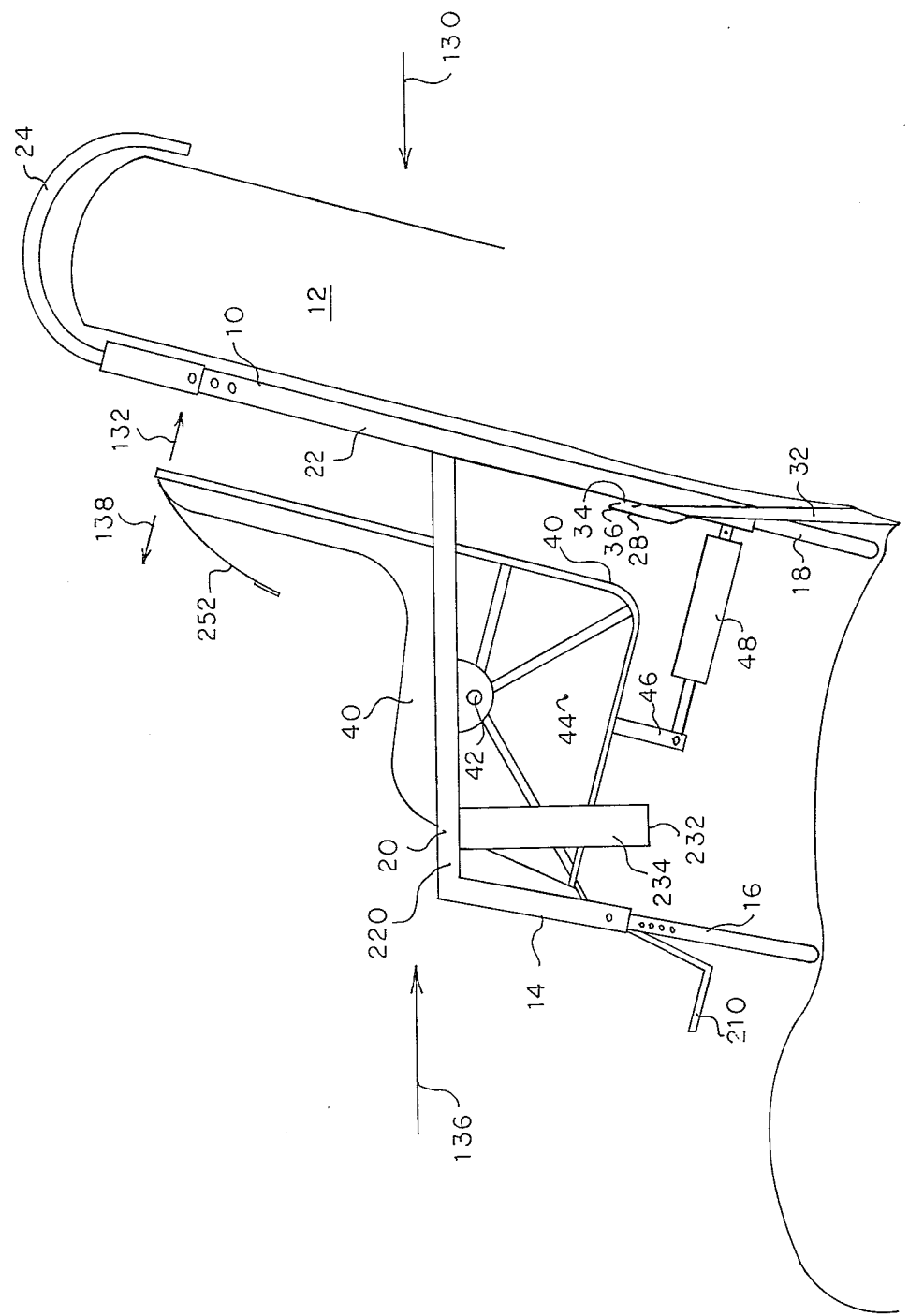
FIG. 1 is a side view of a child's safety seat of the instant invention.

FIG. 1 shows a child's safety seat generally indicated by the number 10 positioned on a motor vehicle passenger seat 12. The safety seat 10 has a frame 14. The frame 14 is an interconnected structure of legs 16 and 18, intermediate structure 20, and back structure 22. Securing means are associated with the frame for removably mounting frame 14 to the external structure which is hereby shown as the seat 12. The securing means, as shown in FIG. 1, is preferably comprised of a pair of spaced apart hooks 24 and 26 as better shown in FIG. 2. The hooks 24 and 26 are each adapted to the back structure 22, as more fully discussed hereinafter. The securing means may also include brackets 28 and 30 secured to the back structure 22 to receive a seat belt 32 typically associated with each passenger position in a conventional motor vehicle. It may be noted that the brackets 28 and 30 have a slot 34 formed therein to permit the seat belt 32 to slide therein. At the same time a lip 36 is provided to inhibit accidental movement of the seat belt out of the bracket upon the application of a force not otherwise or ordinarily anticipated, such as may occur in an accident environment. It may be noted that the brackets 28 and 30 may also be positioned on the front legs 16, as desired by the user.

FIG. 1 also shows a seat 40 proportioned to accommodate a child in a sitting position. The seat 40 is adapted to rotation means, more fully discussed and illustrated hereinafter. The rotation means, generally indicated by the numeral 42, is secured to the intermediate structure 20. The seat is adapted to the rotation means 22 so that the center of gravity 44 of the seat 40 with the child residing therein is below the rotation means. An attachment bracket 46 constituting attachment means is secured to the seat 40 below it and below the center of gravity 44. Deceleration means 48 is secured to the back structure 22 and to the attachment means 46 to retard rotation of the seat 40 about the rotation means 42.

Figure 2:
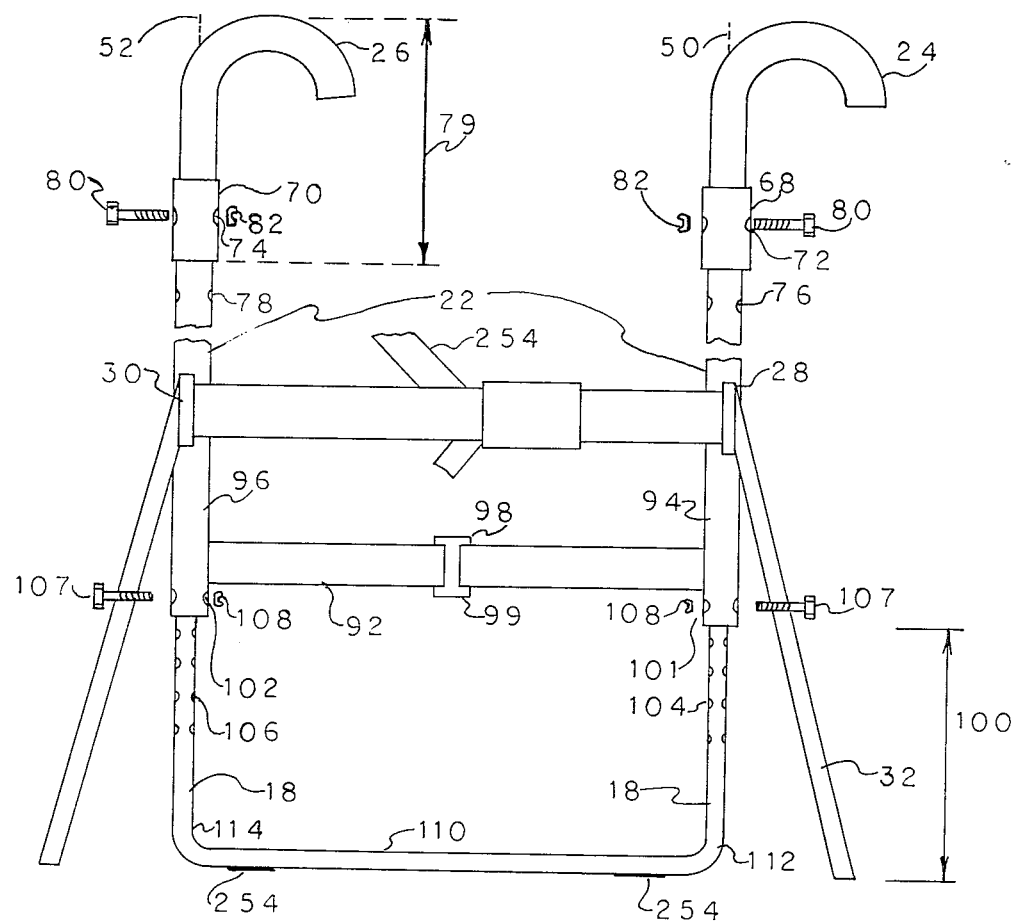
FIG. 2 is a partial view of the rear structure with legs and securing means of a safety seat of the instant invention.
Figure 3:
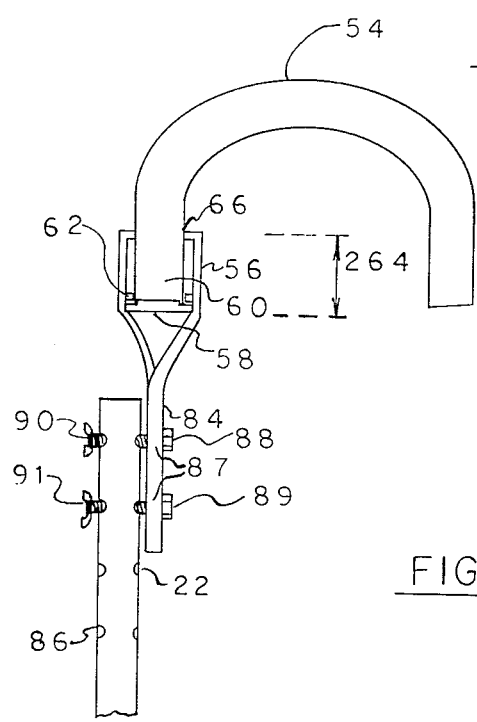
FIG. 3 is a partial side view of securing means for use with a safety seat of the instant invention.

Referring to FIGS. 2 and 3, the securing means therein illustrated are hooks 24 and 26. The hooks 24, 26 are preferably rotatably mounted to pivot about their vertical axes 50 and 52, respectively. As best shown in FIG. 3, the hook 54 is preferably sized to fit within a housing 56. The hook 54 has a lip 58 secured to the end thereof 60. The lip 58 may have a teflon bearing surface associated therewith and is in rotatable contact with the bearing surface 62 affixed to the inside of the casing 58, as shown. It may be noted that a length 64 of the hook 54 is positioned within the housing 56. The upper aperture 66 of the housing 56 may have a teflon surface associated therewith for rotatable contact with the hook 54 to provide additional vertical stability to the hook 54. Those skilled in the art will recognize that other types of securing means can be used and that other structure can be used to provide the rotatability discussed and shown with respect to FIG. 3.

As shown in FIG. 2, the hooks 24 and 26 are associated with their respective housings 68 and 70. The housings 68, 70 have apertures 72 and 74 formed therein to register with corresponding apertures 76 and 78 which are positioned along the length of the upper portion of the back structure 22. Accordingly, the vertical height 79 or length of the hooks 24, 26 may be adjusted by using, as here indicated, a bolt 80 and wing nut 82.

FIG. 3 shows an alternate arrangement. The housing 56 is connected to a flange portion 84. The upper portion of the back structure 22 has a plurality of spaced apart apertures 86 formed therein. The flange 84 has corresponding apertures 87 formed therein to receive a pair of bolts 88 and 89 to securely fasten the flange 84 and in turn the housing 56 to the back structure 22. The bolts 88 and 89 may be secured using wing nuts 90 and 91.

Referring again to FIG. 2, a spacer bar 92 is shown interconnecting the back structure 22. The structure 22 is comprised of two spaced apart members 94 and 96 which are essentially vertical, as better shown in FIG. 1. The spacer 92 is positioned along the vertical length of the spaced apart members 94 and 96 to securely receive the deceleration means 48. As here shown, a simple nut and bolt arrangement 98 and 99 is positioned to secure the deceleration means 48 to the back structure 22. FIG. 2 also shows the rear legs 18. As here shown, the rear legs 18 are adjustable in height 100 by providing apertures 101 and 102 in the lower portion of the spaced apart members 94 and 96, respectively, to register with a plurality of corresponding apertures 104 and 106 formed in the legs 18. A bolt 107 and nut 108 arrangement may be used to securely fasten the legs 18 to the spaced apart members 94 and 96 of the back structure 22. It should also be noted that the legs 18 have an interconnecting spacer 110 interconnecting them at their bottom ends 112 and 114.

Figure 4:
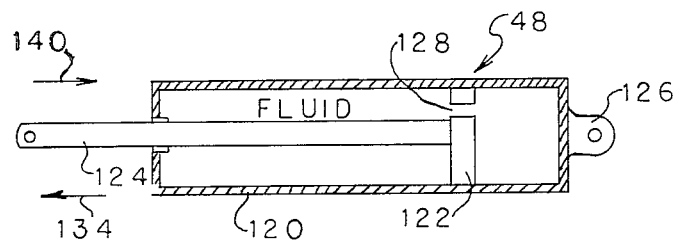
FIGS. 4 and 5 are cross-sectional side views of deceleration means for use with a safety seat of the instant invention.

Referring now to FIG. 4, a deceleration device 48 is shown as a hydraulic cylinder 120 having a piston 122, a shaft 124 and a connector 126. The shaft 124 is attached to the attachment means 46, as shown in FIG. 1. The connector 126 is attached to the nut and bolt 98 and 99, shown in FIG. 2. The cylinder 120 is preferably filled with a hydraulic fluid which may be water or some other fluid. Commercially available devices may have a petroleum based fluid. The piston 122 has an orifice 128 or other comparable means to regulate and restrict the flow of fluids from one side of the piston 122 to the other side of the piston within the cylinder 120. If a force 130 (FIG. 1) is applied by external means to the vehicle seat 12 and in turn the safety seat 10, the seat 40 will tend to rotate in a clockwise direction 132. Because the center of gravity 44 is positioned below the rotation means 42, the shaft 124 will intend to move in an outward direction 134 (FIG. 4). Such movement will be inhibited by the fluid and controlled by the rate of fluid flow through the orifice 128. The orifice is preselected to absorb the shock and retard or decelerate movement imparted to the seat 40. Similarly, if a force from another direction 136 (FIG. 1) is applied, the seat 40 will tend to move in a counterclockwise direction 138 (FIG. 1). In turn, the shaft 124 will tend to move inwardly 140 (FIG. 4). The rate of movement of the shaft and the distance it travels 124 will be controlled by the fluid flow through the orifice 128.

Figure 5:
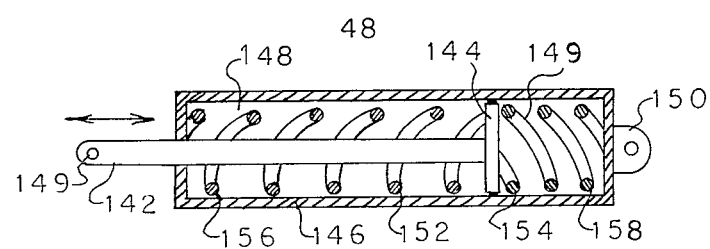

FIG. 5 shows an alternate deceleration device having a shaft 142 connected to a disk 144 slideably positioned within a housing 146. Springs 148 and 149 are positioned within the housing 146 on opposite sides of the disk 144. The springs 148 and 149 compress upon movement of the disk 144 caused by the application of external forces 130 and 136 (FIG. 1). Movement of the seat 40 about the rotation means 42 is similarly inhibited as described with respect to the hydraulic cylinder shown in FIG. 4. The shaft 142 is provided with aperture 149 for connection to the attachment 146 and with a connector 150 for connection to the nut and bolt 98 and 99 on the spacer 92 (FIG. 2). It may be noted that the spring 148 and 149 may be variably compressible. That is, the spring loops 152 and 154 closely adjacent the disk 144 may be soft. The spring loops 156 and 158 farther removed from the disk 144 may be hard. Accordingly, it may be easy to impart a simple rocking chair type motion to the seat 40 by the user or by the application of a simple hand motion to provide, in effect, a rocking chair safety car seat. At the same time, application of strong external forces, such as forces 130 and 136 (FIG. 1), which could cause severe personal injury to the occupant would cause the disk 144 to move through the soft spring leaves or loops 152 and 154 to be in contact with the harder spring loops 156 and 158 to provide deceleration and to retard movement of the seat 40.

Those skilled in the art will recognize that the deceleration means 48 may be a conventional shock absorber device using hydraulic fluids and springs in combination or singularly as desired by the user. It may also be any other device which permits energy to be controlled as herein indicated.

Figure 6:
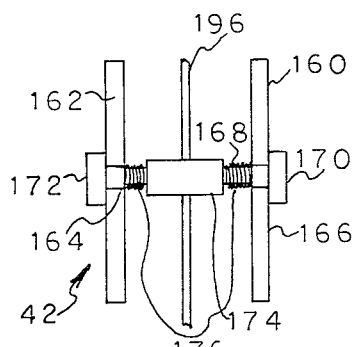
FIGS. 6 and 7 are partial top views of rotation means for use with a safety seat of the instant invention.

Referring now to FIG. 6, a top view of the rotation means 42 is shown. The rotation means 42 is here comprised of two spaced apart flanges 160 and 162 interconnected or directly adapted to the intermediate structure 20. The flanges 160 and 162 have an aperture 164 and 166 formed therein to rotatably receive a shaft 168. As here shown, the shaft has a cap on each end 170 and 172 affixed to the distal ends of the shaft to hold the shaft in position. A variety of caps 170 and 172 may be used, including nuts, bolts, cotter pins with washers, and other devices known to those skilled in the art. The seat 40 has structure, more fully discussed hereinafter, to which a shaft housing 174 is affixed. The shaft housing receives the shaft 166 in rotatable relationship therewith. Appropriate bearing surfaces are provided within the housing 174. As shown in FIG. 6, a gap exists between the shaft housing and the flanges 160 and 162. A spring 176 may be positioned therebetween to restrict movement of the seat 40 upon application of forces having components normal to the forces 130 and 136, shown in FIG. 1. Rotation of the housing 174 about the shaft 168 is not inhibited by the use of washers or other similar slideable surfaces to permit rotation of the shaft 168, as known to those skilled in the art.

Figure 7:
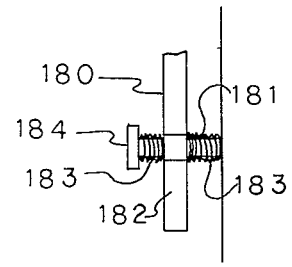

FIG. 7 shows rotation means 42 having a single plate 180 secured to the intermediate structure 20. A shaft 181 extends away from the side structure of the seat 40, which is more fully discussed hereinafter, through an aperture 182 formed in the plate 180. A spring 183 may be positioned between the side structure of the seat 40 and the plate and between the plate 180 and the distal capped end 184 of the shaft 181 to retard movement comparable to the spring 176, shown in FIG. 6.

Figure 8:
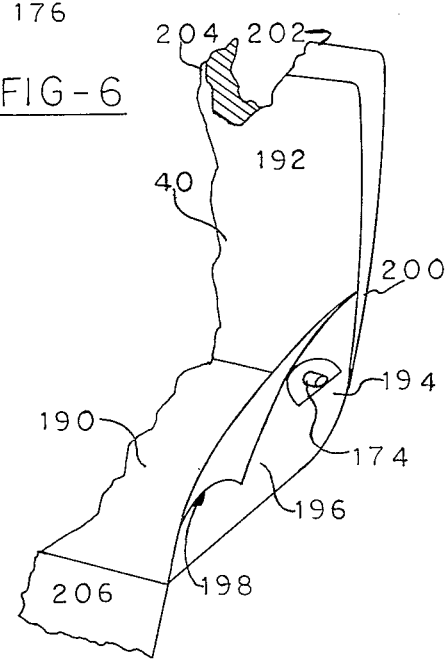
FIGS. 8 and 9 are partial perspective views of seat structure for use with a safety seat of the instant invention.

FIG. 8 is a perspective cut-away view of the seat 40. It shows that the seat 40 is preferably formed as a bucket seat having a bottom 190, a back 192, and a side 194. As shown in FIG. 8, a side plate 196 is affixed to the side 194 of the seat 40 to extend away therefrom a distance 198 sufficient to permit the side plate 196 to be positioned for alignment with the flanges 160 and 162, shown in FIG. 6. Accordingly, the housing 174 is properly positioned for rotatable adaption to the shaft 168. Similarly, the shaft 181 of FIG. 7, may be directly adapted to the side plate 196 or directly to the side 194 of the seat 40.

Figure 9:
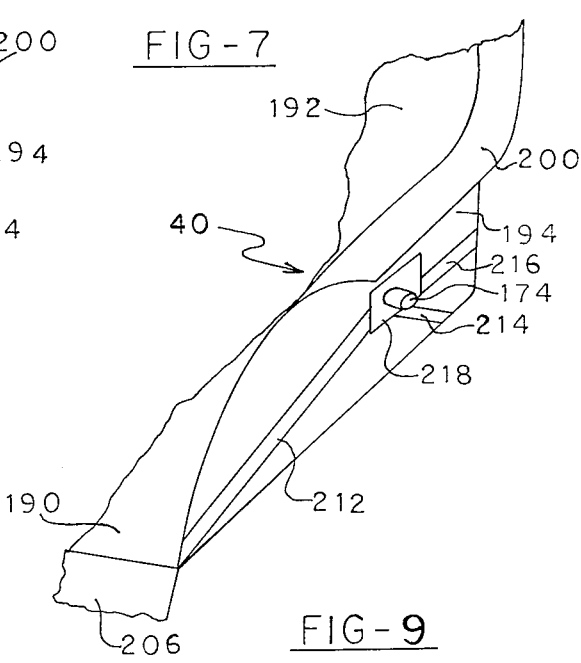

It may be noted that the seat 40 has an armrest 200 positioned on opposite sides thereof. The armrests angle upwardly and outwardly, as best shown in FIGS. 8 and 9. The armrest 200 is curved and winglike to clear the intermediate structure 20 upon rotation of the seat 40. The curved structure of the armrests 200 provides adequate support for the occupant of the seat by extending over the intermediate structure 20 to ensure that the occupant, as well as toys or other things that the occupant may have in his possession, will not become fouled to interfere with the rotational movement of the seat 40. It may also be noted that the seat is covered with a resilient material 202 which may be foam rubber or comparable padding for comfort and to minimize bruise damage if external forces are applied to the seat 10. The resilient material 202 may be covered with another material 204. That material 204 may be a conventional seat covering material which is known to those skilled in the art. A footrest 206 may be affixed to the bottom 190 of the seat to receive the feet and lower legs of the occupant. The footrest may have a lip or ledge 210 (FIG. 1) to provide a resting surface for the feet of the occupant.

FIG. 9 shows alternate side structure. That is, a plurality of arms 212 may be used in lieu of the side plate 196. As here shown, three arms 212, 214, and 216 are shown connected to the structure of the seat 40 angulated outward therefrom and connected to a flange 218. The flange has a housing 174 affixed thereto for rotatable adaptation to the shaft 168. Alternately, the shaft 181 (FIG. 7) may be secured to the flange 218.

Figure 10:
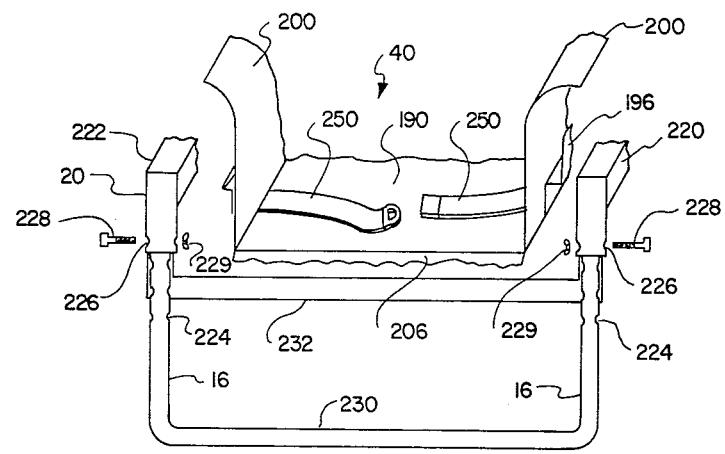
FIG. 10 is a partial perspective view of intermediate structure, legs and seat structure for use with a safety seat of the instant invention.

FIG. 10 shows a partial front view of the seat 40, intermediate structure 20 and front legs 16. As shown in FIGS. 1 and 10, the intermediate structure 20 is comprised of two spaced apart members 220 and 222 which are connected to the back structure 22. In particular, the spaced apart members 220 and 222 are connected respectively to the spaced apart members 94 and 96, respectively, of the back structure 22. The intermediate spaced apart members 220 and 222 extend essentially horizontally away from the back structure 22, as best shown in FIG. 1. The intermediate structure may be regarded as L-shaped having a section pointing downwardly to coact with the legs 16. As shown, the legs 16 may have apertures 224 formed along their length to interact and register with corresponding apertures 226 and 228 formed in the downward sections of the intermediate structure. A bolt 228 and nut 229 arrangement may be used to secure the legs 16 to the downward portion of the intermediate structure 20. A spacer 230 interconnects the legs 16 along their bottom to provide structural stability and a better footing for the chair 10. Another spacer 232 is also shown which interconnects the spaced apart members 220 and 222 of the intermediate structure. The spacer 232 provides structural support and rigidity to preclude collapse of the intermediate structure upon the application of a severe external force. It may be noted that the spacer 232, as shown in FIG. 1, has a vertical member 234 extending downward from the spaced apart members 220 and 222.

Figure 12:
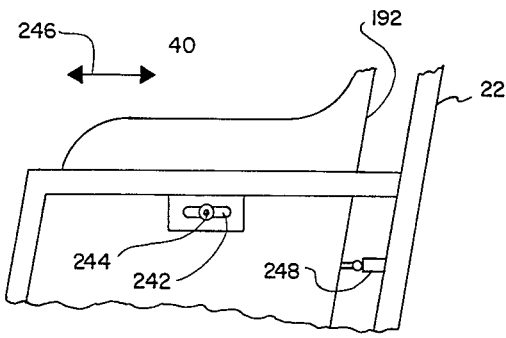
FIG. 12 is a partial side view of a safety seat of the instant invention.
Figure 11:
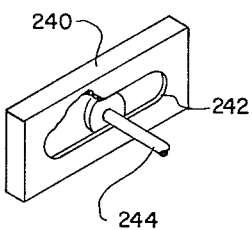
FIG. 11 is a partial perspective side view of rotation means for use with a safety seat of the instant invention.

FIG. 11 shows an alternate rotation means. It has an upper edge 240 for connection to intermediate structure 220. An elongated slot 242 is formed therein to receive the shaft 244. The elongated slot 242 allows the shaft 244 to move in an essentially horizontally direction upon the application of external forces thereto. It also allows the shaft 244 to rotate within the slot. Either the flanges 160 and 162 of FIG. 6 or the plate 180 of FIG. 7 may be provided with an elongated slot arrangement as shown in FIG. 11. Provision of the elongated slot 242 allows the chair 40 to move in an essentially horizontal direction 246, as shown in FIG. 12. Additional deceleration means 248 may be adapted to the back structure 22 and to the back 192 of the seat 40. The deceleration means 242 is a smaller sized version of the deceleration means shown in FIGS. 4 and 5 illustrated as item 48 in FIG. 1. That is, the amount of experienced horizontal 246 movement would be less than the potential rotational movement allowing for a smaller and equally as effective deceleration device.

In operation, the seat 10 may be installed on a motor vehicle passenger seat 12, such as that which may be typically found in a passenger vehicle. The hooks 24 and 26 are spaced apart to accommodate headrests which are today typically found on most motor vehicles of newer vintage. Upon installation, the rear legs 18 and/or the hooks 24 and 26 are adjusted along their lengths to provide proper sizing for a snug fit over the top of the seat 12. Further, if desired by the user, the seatbelt 32 which is typically found in passenger vehicles of recent vintage may be used to more firmly secure the seat 10 in position on the seat 12. An over-the-shoulder seat belt, as found in many conventional passenger vehicles of recent vintage, provides additional securement for the safety seat 10. A bucket seat 40 adapted for children potentially in the age group from approximately age one through about age six or seven is provided with resilient padding for comfort and to absorb shock, as hereinbefore discussed. The seat 40 is also provided with safety belts 250 and 252 for across the lap and over the shoulder use, as desired. It may also be noted that the weight of the child will cause the front and rear legs 16 and 18 to somewhat indent into the seating material of the passenger seat 12. This in turn will provide some support against movement of the safety seat 10 due to the friction necessary to cause the legs to move in one direction or another. Appropriate grips or friction devices 254 may be placed along the lower edges of the legs 16 and 18 to reduce the likelihood of the safety seat 10 being dislodged from its residing position on the car seat 12. When a child is placed in the seat 40 of the safety seat 10, the center of gravity 44 of the combined child and the seat is below the axis of rotation which is in effect the shaft 168 (FIG. 6) and 181 (FIG. 7) of the rotation means 42. As shown in FIG. 1, the center of gravity 44 is positioned significantly below the axis of rotation of the rotation means 42. When forces such as that shown by the arrow 130 and 136 are applied to the seat structure 12 a child residing in a rigidly mounted seat could experience severe trauma. For example, if force is applied from behind, whiplash, among other injuries, is possible. With the safety seat 10, as shown in FIG. 1, the center of gravity 44 will be the focal point of forces being transmitted to the safety seat 10. In turn, the bucket seat 40, by virtue of inertia and other forces, will tend to rotate in either the clockwise 132 or counterclockwise 138 directions. The deceleration means 148 will act to cushion the shock delivered to the body of the child residing in the seat 40 and in turn minimize or reduce the potential for impact injuries such as whiplash and the like. Providing springs 176 (FIG. 6) and 183 (FIG. 7) in combination with the rotation means 42 provides additional shock absorption or retardation means to absorb shock and minimize injuries, such as whiplash, when external forces are applied that have force components which may be regarded as normal to the forces 130 and 136 (in FIG. 1). Further, use of the slotted rotation device as shown in FIG. 11 along with a second deceleration means 248, improves the shock absorption capabilities of the safety seat 10 to further restrict or minimize the trauma which may be suffered by the safety seat 10 occupant.

In some circumstances, it may be desirable to lock the seat 40 in place for a particular purpose. That is, slight movement of the seat 40 could interfere with feeding-/eating activities, initial seating or removal of the child, or other activities in which it would be desirable to have the seat 40 rigid. As depicted in FIGS. 1 and 2, a locking device is provided. It is shown as a tubular member 270 having a 'C' shaped section which may be regarded as a wedge member 272. The tubular member is mounted to the back structure 22 with flanges 274 and 276 which have apertures formed therethrough to rotatably receive the tubular member 270. A handle 278 is unitarily formed to extend substantially normal to the axis 280 of the member 270. The handle 278 is shown positioned on the driver's side of the seat 10. A handle may also be adapted to the distal end 282 of the member 270. The wedge member 272 is sized in width 284 so that upon rotation thereof it will contact the lower portion of the seat 40 below rotation axis of the seat 40 and force the seat to rotate slightly in the clockwise direction 132. In turn, the seat 40 is held snugly in position. A lip member 286 may be affixed to the seat 40 to in effect latch the wedge member 272 in position. Thus, the user may lock the seat 40 by moving the handle 278 and in turn the wedge member 272 through the arc 288.

It is to be understood that the embodiments of the invention above-described are merely illustrative of the application of the principals of the invention. In reference herein to details of the illustrated embodiments is not intended to limit the scope of the claims which themselves recite those features which are regarded as essential to the invention.

I claim:

1. Vehicle safety seat apparatus for children comprising:
    a frame having interconnected legs, intermediate structure and back structure, said frame adapted to receive a seat member, said intermediate structure being located at about the height of armrests of the seat member;
    securing means associated with said frame for removably mounting said frame to external structure, said securing means adapted to receive a seat belt fastened to said vehicle;
    rotation means secured to said intermediate horizontal structure, said rotation means located about midway between front and back of a seat disposed in said frame means;
    a seat proportioned to accommodate a child adapted to said rotation means so that the center of gravity of said seat with a child residing therein is below said rotation means to rotate thereabout;
    attachment means secured to said seat below said seat and said center of gravity; and
    deceleration means secured to said back structure and to said attachment means to retard rotation of said seat about said rotation means.

2. The apparatus of claim 1 wherein said external structure is a vehicle seat structure and wherein said securing means includes a pair of spaced apart hooks adapted to said back structure; said hooks being sized to fit about the top of said seat structure.

3. The apparatus of claim 2 wherein each hook has a foot and is rotatable thereabout; and wherein each said foot is adjustably adapted to said back structure to adjust in length substantially in the plane of said back structure.

4. The apparatus of claim 1 wherein said intermediate structure is comprised of two spaced apart members connected to said back structure to extend away therefrom essentially horizontally, said members being sized in length and being spaced apart a distance to receive said seat therebetween.

5. The apparatus of claim 4 wherein said back structure is comprised of two essentially vertical spaced apart members to connect with said intermediate structure and wherein said frame includes a plurality of spacers to selectively interconnect the spaced apart members of the intermediate structure, the spaced apart members of the back structure and the legs.

6. The apparatus of claim 5 wherein said legs are comprised of four leg members two extending downwardly from respective spaced apart members of the intermediate structure and two extending downwardly from respective spaced apart members of said back structure, and wherein said legs have means to adjust their vertical length.

7. The apparatus of claim 4 wherein said seat includes a bottom, back and a pair of arms each of which have an armrest extending curvedly upward and outward from said seat over said spaced apart members of said intermediate structure.

8. The apparatus of claim 7 wherein said seat has a foot tray connected to said bottom to extend downwardly from said bottom to receive the lower legs and feet of the user.

9. The apparatus of claim 8 wherein said seat is covered with a resilient padding material.

10. The apparatus of claim 7 wherein said rotation means includes:
    a base structure secured to said intermediate structure;
    a shaft rotatably adapted to said base structure; and
    suspension means secured to said seat and rotatably adapted to said shaft to rotatably suspend said seat from said frame.

11. The apparatus of claim 10 wherein said seat has structure interconnecting said arms and said bottom and wherein said suspension means is an aperture formed in said interconnecting structure to rotatably receive said shaft.

12. The apparatus of claim 11 wherein said seat has sides interconnecting said bottom back and armrests and is formed as a bucket seat.

13. The apparatus of claim 10 wherein said suspension means is a flange adapted to said seat to extend upwardly from the bottom thereof, said flange having means to rotatably receive said shaft.

14. The apparatus of claim 10 wherein said suspension means is a flange having means to rotatably receive said shaft and a plurality of support bars connected to said seat and said flange.

15. The apparatus of claim 10 wherein said base structure has two plate members spaced apart to receive said suspension means and means to rotatably receive said shaft.

16. The apparatus of claim 10 wherein said base member is a plate having an elongated slot formed therein essentially horizontally and wherein said shaft is sized to rotatably and slideably fit within said slot and have means to retain it therein, and wherein said seat has second attachment means, said apparatus has second deceleration means secured to said second attachment means and to said back structure to retard movement of said shaft and seat in the elongated slot.

17. The apparatus of claim 1 wherein said deceleration means is a hydraulic cylinder with a piston connected to said attachment means; said piston having restriction means to pass fluid therethrough and being positioned at rest so that upon application of force to cause said seat to rotate about said rotation means said piston passes fluid from one side thereof to the other to retard said seat movement.

18. The apparatus of claim 1 wherein said deceleration means is spring means tensionally mounted between said attachment means and said back structure to retard rotation of said seat upon application of external forces to cause said seat to tend to rotate about said rotation means.

19. The apparatus of claim 1 further including locking means secured to said apparatus to selectively lock said seat in a fixed position.

20. The apparatus of claim 19 wherein said locking means is comprised of:

a wedge member rotatably adapted to said back structure;

handle means adapted to said wedge member; and wherein said wedge member is sized in length to wedge against the lower portion of said seat upon rotation thereof by operation of said handle means.

21. In combination with a conventional motor vehicle passenger seat, a safety seat apparatus for children comprising:

a frame having interconnected legs, intermediate structure and back structure;

securing means associated with said frame for removably mounting said frame to said vehicle passenger seat;

rotation means secured to said intermediate horizontal structure;

a seat proportioned to accommodate a child adapted to said rotation means so that the center of gravity of said seat with a child residing therein is below said rotation means to rotate thereabout;

attachment means secured to said seat below said seat and said center of gravity; and deceleration means secured to said back structure and to said attachment means to retard rotation of said seat about said rotation means.

* * * * *